United States Patent [19]
Dippel et al.

[11] Patent Number: 5,991,353
[45] Date of Patent: Nov. 23, 1999

[54] CORE BARREL FOR A REACTOR PRESSURE VESSEL OF A NUCLEAR REACTOR PLANT AND METHOD OF REPAIRING A CORE BARREL

[75] Inventors: Bruno Dippel, Poxdorf; Herbert Schramm, Höchstadt A.D. Aisch, both of Germany

[73] Assignee: Siemens Aktiengesellschaft, Munich, Germany

[21] Appl. No.: 09/151,961

[22] Filed: Sep. 11, 1998

Related U.S. Application Data

[63] Continuation of application No. PCT/EP97/01009, Feb. 28, 1997.

[30] Foreign Application Priority Data

Mar. 11, 1996 [DE] Germany .......................... 196 09 344

[51] Int. Cl.[6] .............................. G21C 13/02; G21C 5/10
[52] U.S. Cl. ........................................ 376/302; 376/260
[58] Field of Search ................................ 376/260, 285, 376/287, 302, 303, 461

[56] References Cited

U.S. PATENT DOCUMENTS

| 5,402,570 | 4/1995 | Weems et al. .......................... 376/302 |
| 5,566,216 | 10/1996 | Ly ........................................... 376/258 |

FOREIGN PATENT DOCUMENTS

| 71 323 313 | 9/1971 | France . |
| 20 24 630 | 1/1971 | Germany . |
| 26 43 011 | 3/1978 | Germany . |
| 22 56 645 C2 | 8/1983 | Germany . |
| 257 958 A3 | 2/1986 | Germany . |
| 25 25 410 C2 | 7/1986 | Germany . |

OTHER PUBLICATIONS

Abstract of Soviet Patent Application No. 94–033676 (Shavkelo et al.), Apr. 1994.

"Boiling Water Reactors for Nuclear Power Plants" (Sauer), AEG–Telefunken Manuals, vol. 10, 1969, pp. 99–101.

*Primary Examiner*—Daniel D. Wasil
*Attorney, Agent, or Firm*—Herbert L. Lerner; Laurence A. Greenberg

[57] ABSTRACT

A core barrel for a reactor pressure vessel of a nuclear reactor plant has a carrying structure that is supported on an inner surface of the shroud of the barrel. The carrying structure receives a tension rod that extends parallel to the longitudinal axis of the barrel and braces the shroud in the axial direction.

9 Claims, 3 Drawing Sheets

CORE BARREL FOR A REACTOR PRESSURE VESSEL OF A NUCLEAR REACTOR PLANT AND METHOD OF REPAIRING A CORE BARREL

CROSS-REFERENCE TO RELATED APPLICATION

This is a continuation of copending international application PCT/EP97/01009, filed Feb. 28, 1997, which designated the United States.

BACKGROUND OF THE INVENTION

Field of the Invention

The invention lies in the field of nuclear power generation. More specifically, the invention pertains to a core barrel for a reactor pressure vessel of a nuclear reactor plant and to a method for repairing a core barrel. Such core barrels are known, for example, from AEG-Telefunken-Handbuch [AEG-Telefunken manual], Vol. 10, "Siedewasserreaktoren für Kernkraftwerke" ["Boiling Water Reactors for Nuclear Power Plants"], Andrej Sauer, Berlin 1969, p. 100, or from U.S. Pat. No. 4,038,136 to Gallet et al. Those prior art core barrels are essentially cylindrical containers which are supported on the shell of the reactor pressure vessel, on bearings or projections, and which carry the reactor core.

During operation, particularly in boiling water reactor plants, the core barrel—disposed in the reactor pressure vessel of a nuclear reactor plant for the purpose of receiving the reactor core—may be damaged at the weld seams located on its shroud. Although the loads acting on the weld seams are slight during normal operation, higher loads may occur in the event of design basis accidents, and these loads have to be safely eliminated in order to preserve the shutdown capability and the intactness of the core internals. It is necessary, in particular, to prevent a situation where a weld seam on the shroud of the core barrel (core shroud) ruptures completely resulting in the risk that the core grid could shift.

SUMMARY OF THE INVENTION

It is accordingly an object of the invention to provide a core barrel for a reactor pressure vessel and a repair method, which overcome the above-mentioned disadvantages of the heretofore-known devices and methods of this general type and which, even if a weld seam on the core shroud breaks through completely, the loads occurring during a design basis accident are safely absorbed and eliminated. It is a further object to specify a method for repairing a core barrel.

With the foregoing and other objects in view there is provided, in accordance with the invention, a core barrel for a reactor pressure vessel of a nuclear reactor plant, comprising:

a shroud forming a core barrel having a longitudinal axis;

a carrying structure supported on an inner surface of the shroud; a tension rod received in the carrying structure, the tension rod extending parallel to the longitudinal axis and bracing the shroud in a direction of the longitudinal axis.

Due to the installation of tension rods, the critical weld seams on the core shroud are bridged and the individual core barrel sections are held together. If the core shroud weld seams fail, the loads caused by pressure changes inside the core barrel are safely absorbed. Since the tension rods are installed inside the core barrel, the interspace between the core shroud and the reactor pressure vessel remains accessible for servicing and testing appliances, for example manipulators for testing the core shroud weld seams.

In accordance with an added feature of the invention, the shroud has a pocket formed therein and the tension rod includes a hook disposed at one end thereof and engaging into the pocket in the shroud.

In accordance with an additional feature of the invention, a thrust plate is supported on a shoulder of the shroud, and the tension rod is braced against the thrust plate.

In accordance with another feature of the invention, the carrying structure comprises a guide tube receiving the tension rod. The guide tube is formed with spacers by means of which the guide tube is supported on an inner surface of the shroud perpendicularly to a circumferential direction.

In accordance with a further feature of the invention, the guide tube is provided with bolts engaging into bores formed in the shroud.

In accordance with again an added feature of the invention, an inner tube is disposed between the tension rod and the guide tube, the inner tube has an end formed with a collar bracing the inner tube against the thrust plate via the tension rod.

In accordance with again an additional feature of the invention, a fastening element is braced by the tension rod against the shoulder of the shroud, the fastening element projecting through the shroud into a space between the core barrel and an inner surface of the reactor pressure vessel, and including an elastic support received in the fastening element and bearing resiliently on the inner surface.

In accordance with a concomitant feature of the invention, the fastening element is L-shaped and comprises a vertical leg bearing on an outer surface of the shroud. The leg is formed with a guide in which the elastic support is vertically displaceably mounted.

In other words, it is advantageous if the tension rod braces a fastening element against the shoulder of the shroud. The fastening element is guided through the shroud into the space between the core barrel and the inner surface of the reactor pressure vessel and receives an elastic support which bears resiliently on the inner surface. The fastening element is preferably L-shaped and comprises a vertically arranged leg bearing on the outer surface of the core shroud and having a guide in which the support is mounted so as to be vertically displaceable.

With the above and other objects in view there is also provided, in accordance with the invention, a method of repairing a core barrel of a reactor pressure vessel of a nuclear reactor plant, which comprises: disposing a carrying structure on an inner surface of a shroud of a core barrel of a reactor pressure vessel, inserting a tension rod in the carrying structure parallel to a longitudinal axis of the core barrel, and bracing the shroud in an axial direction with the tension rod.

A core barrel that has defective weld seams on the core shroud can continue to be used, since, even if a round weld seam ruptures completely, it is certain that the core internals will remain intact.

Other features which are considered as characteristic for the invention are set forth in the appended claims.

Although the invention is illustrated and described herein as embodied in a core barrel for a reactor pressure vessel of a nuclear reactor plant and method for repairing a core barrel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
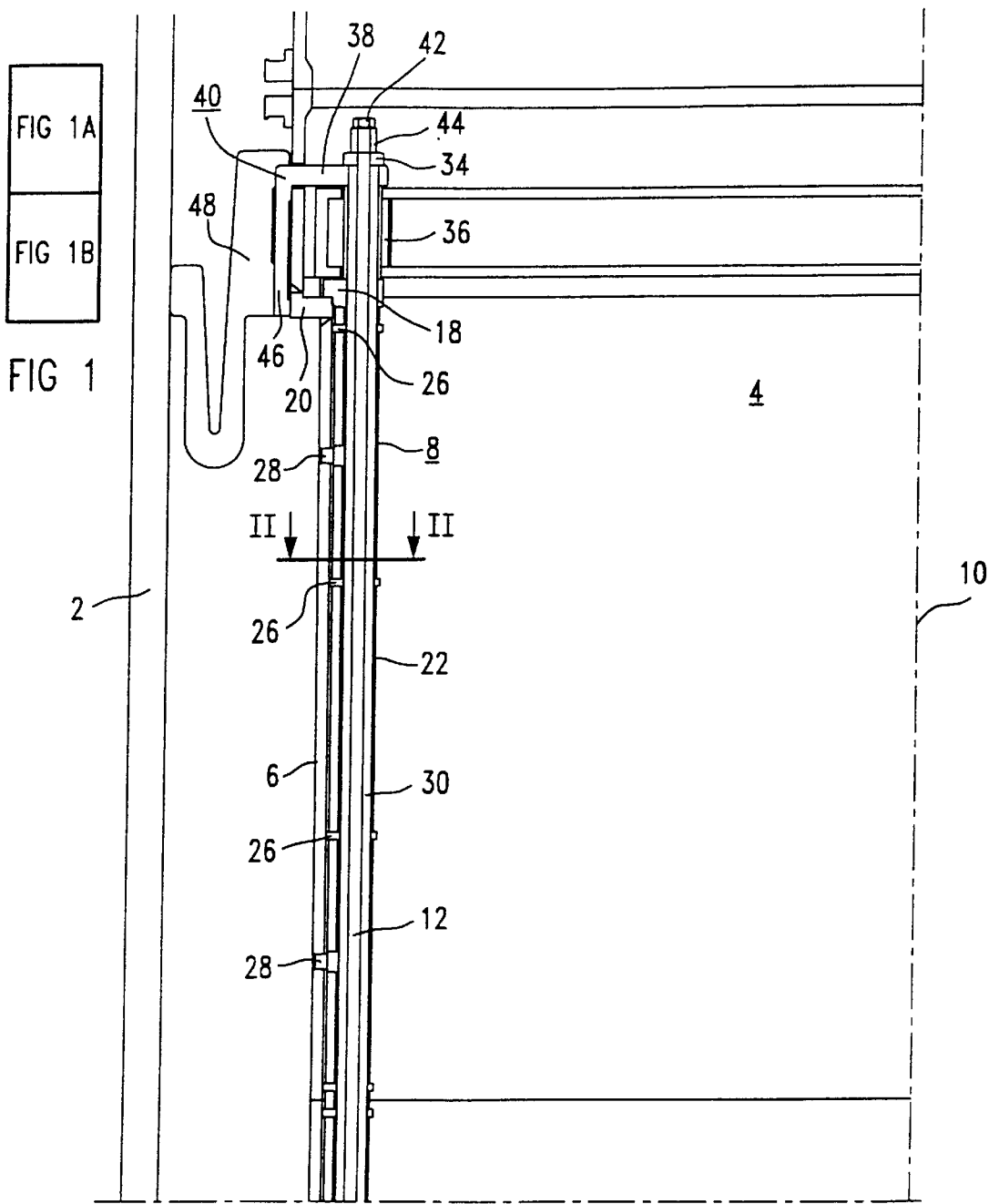
FIG. 1—separated into FIGS. 1A and 1B—is a partial diagrammatic sectional view of a core barrel according to the invention, taken parallel to the longitudinal axis of the barrel.
Figure 1B:
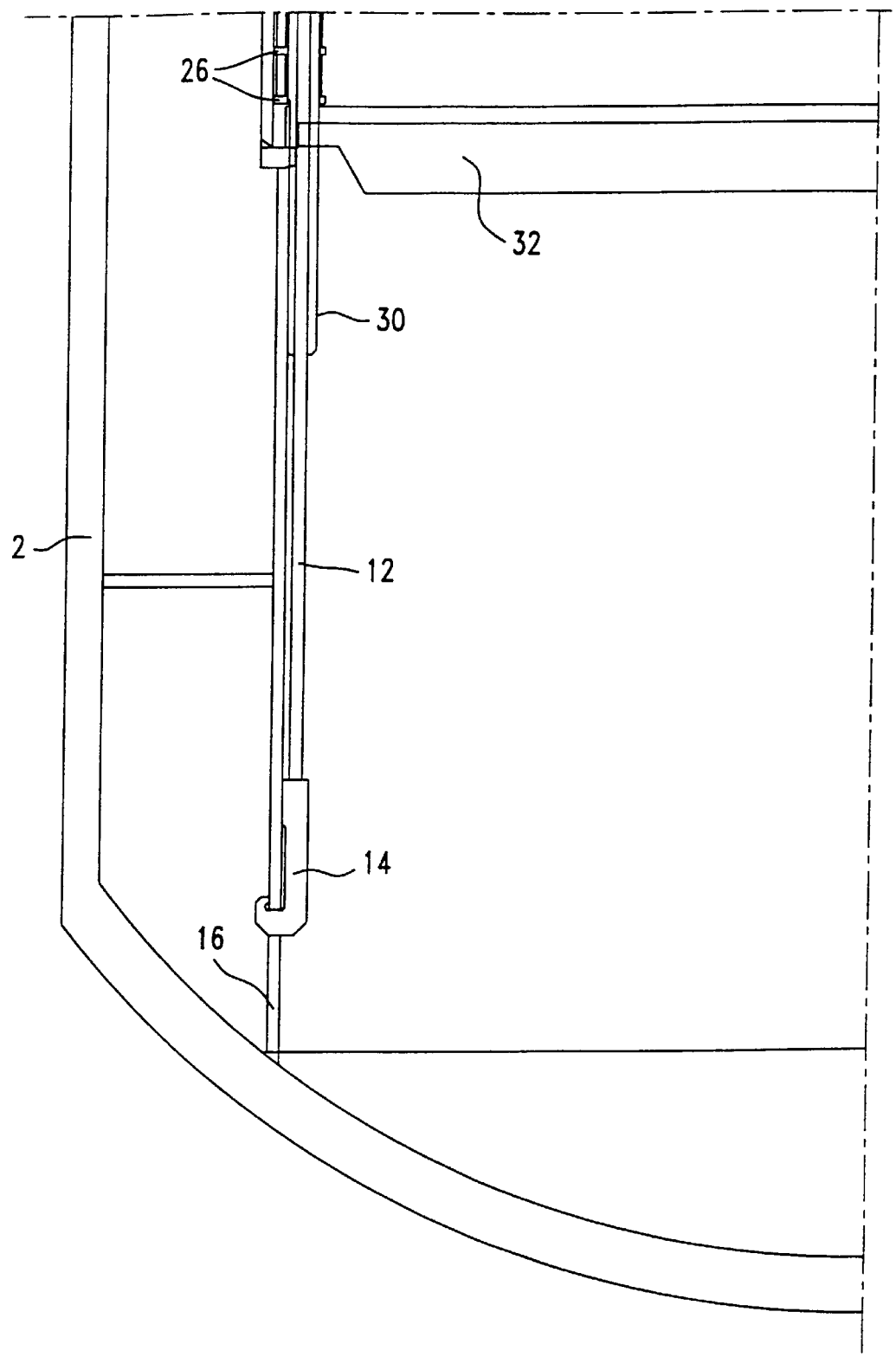

Referring now to the figures of the drawing in detail and first, particularly, to FIG. 1 thereof, there is seen a core barrel 4 inside a reactor pressure vessel 2. The barrel 4 has a shroud 6 with a carrying structure 8 which receives a tension rod 12 extending parallel to a longitudinal axis 10 of the barrel. The tension rod 12 braces the shroud 6 in a direction parallel to the longitudinal axis 10, i.e., in the axial direction.

The tension rod 12 is provided, at its end towards the bottom of the reactor pressure vessel 2, with a hook 14 which is fitted into a pocket 16 located in the shroud 6. In the exemplary embodiment, the pocket 16 is an existing overflow orifice in the shroud 6. However, if required, it may also be eroded or milled into the shroud 6 at a later stage.

The carrying structure 8 comprises a thrust plate 18 which is supported on a shoulder 20 on the shroud 6. A guide tube 22 is welded to the thrust plate 18 and extends parallel to the longitudinal axis 10 along the shroud 6.

Spacers 26 are disposed on the guide tube 22 by means of which the guide tube 22 is supported against the inner surface of the shroud 6. In addition, two bolts 28 are mounted at different levels on the guide tube 22 and engage into bores in the shroud 6.

The guide tube 22 receives a thick-walled inner tube 30 which fits accurately through a lower core structure plate 32 arranged in the core barrel 4 and which bears on the inner surface of the shroud 6 below the core structure plate 32. The inner tube 30 projects through the thrust plate 18 and has a collar 34 by means of which the inner tube rests on the thrust plate 18, and is braced against the same, via a thrust sleeve 36 and a horizontal leg 38 of an L-shaped fastening element 40.

The tension rod 12 is guided through the inner tube 30, is screwed against the collar 34 by means of a nut 42 and is braced against the thrust plate 18 resting on the shoulder 20 of the shroud 6. Between the nut 42 and the collar 34 there is arranged an elastic intermediate piece 44, for example cup springs. The elastic intermediate piece allows differential expansions between the core shroud 6 and tension rod 12 to be compensated during the startup and shutdown operations. The tension rod 12 braces the shroud 6 between the shoulder 20 and the pocket 16, into which the hook 14 engages. The upwardly directed forces acting on the shroud 6 are thereby absorbed.

An L-shaped fastening element 40 is also braced against the shoulder 20 of the shroud 6 by means of the tension rod 12. The fastening element 40 projects with its horizontal leg 38 through the shroud 6 and bears with its other leg 46, extending parallel to the longitudinal axis 10 (i.e., vertically), on the outer surface of the shroud 6. This leg 46 receives in a guide, for example a vee guide, an elastic demountable support 48 which bears resiliently on the inner surface of the reactor pressure vessel 2. The core barrel 4 is supported on the reactor pressure vessel 2 by means of the support 48.

According to the conditions in the individual plants, a plurality of tension rods 12 are arranged on the circumference of the core shroud 6, inside the core barrel 4.

By virtue of the flexurally rigid carrying structure 8, it is no longer possible for the individual sheet metal sections of the core barrel and flanges or the core grids to shift horizontally if a round weld seam fails completely. The engagement of the bolts 28 into the shroud 6 prevents a shift in the circumferential direction. The rupture of a vertical weld seam is absorbed by the tension rods 12.

Figure 2:
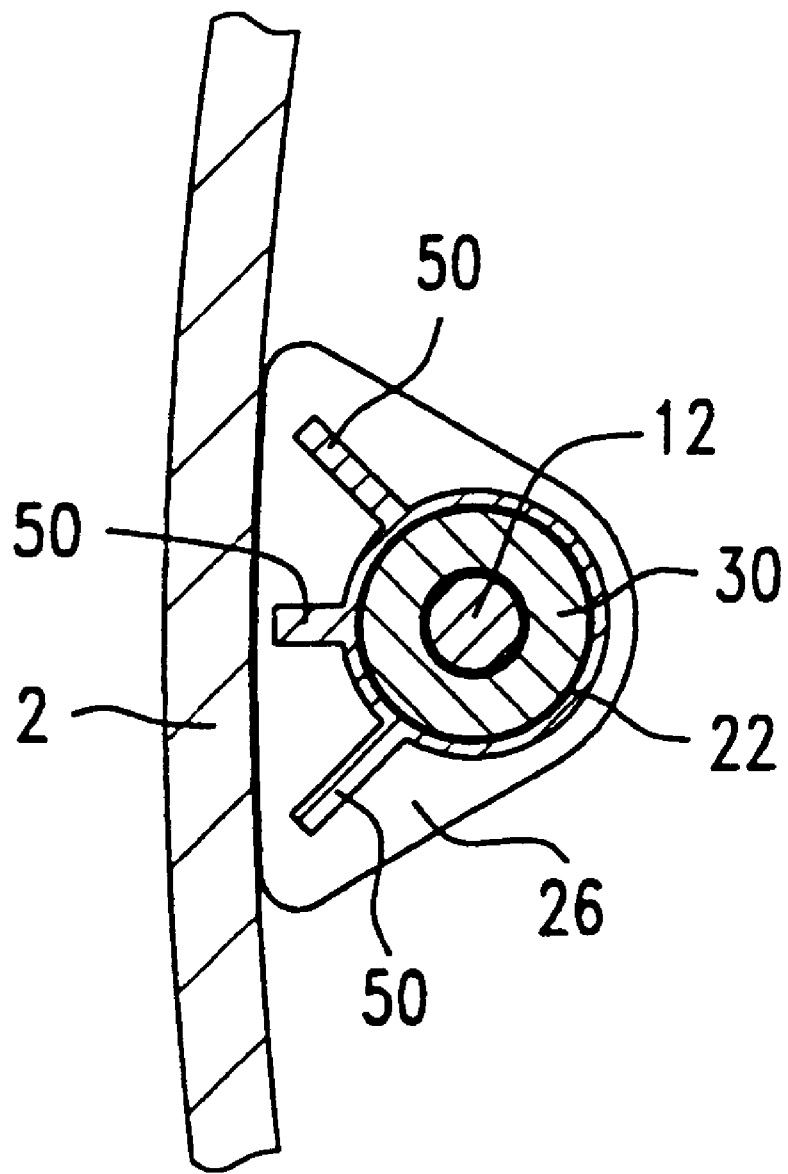
FIG. 2 is a cross sectional view of a detail of the shroud of the core barrel.

Referring now to the enlarged illustration of FIG. 2, the spacers 26 are welded to the guide tube 22. In the exemplary embodiment, the spacers 26 are metal sheets which, at their edge facing the shroud 6, are adapted to the curvature of the shroud 6 and bear on the latter. Reinforcing plates 50 welded to the guide tube 22 can also be seen in the figure. The plates extend in the longitudinal direction and additionally reinforce the entire carrying structure.

We claim:

1. A core barrel for a reactor pressure vessel of a nuclear reactor plant, comprising:
    a shroud forming a core barrel having a longitudinal axis;
    a carrying structure supported on an inner surface of said shroud;
    a tension rod received in said carrying structure, said tension rod extending parallel to said longitudinal axis and bracing said shroud in a direction of said longitudinal axis.

2. The core barrel according to claim 1, wherein said shroud has a pocket formed therein and said tension rod includes a hook disposed at one end thereof and engaging into said pocket in said shroud.

3. The core barrel according to claim 2, wherein said shroud is formed with a shoulder, and including a thrust plate supported on said shoulder of said shroud, and wherein said tension rod is braced against said thrust plate.

4. The core barrel according to claim 3, wherein said carrying structure comprises a guide tube receiving said tension rod and formed with spacers by means of which said guide tube is supported on an inner surface of said shroud perpendicularly to a circumferential direction.

5. The core barrel according to claim 4, wherein said shroud has bores formed therein, and said guide tube is provided with bolts engaging into said bores formed in said shroud.

6. The core barrel according to claim 5, which further comprises an inner tube disposed between said tension rod and said guide tube, said inner tube having an end formed with a collar bracing said inner tube against said thrust plate via said tension rod.

7. The core barrel according to claim 6, which further comprises a fastening element braced by said tension rod against said shoulder of said shroud, said fastening element projecting through said shroud into a space between said core barrel and an inner surface of the reactor pressure vessel, and including an elastic support received in said fastening element and bearing resiliently on the inner surface.

8. The core barrel according to claim 7, wherein said fastening element is L-shaped and comprises a vertical leg bearing on an outer surface of said shroud, said leg being formed with a guide in which said elastic support is vertically displaceably mounted.

9. A method of repairing a core barrel of a reactor pressure vessel of a nuclear reactor plant, which comprises: disposing a carrying structure on an inner surface of a shroud of a core barrel of a reactor pressure vessel, inserting a tension rod in the carrying structure parallel to a longitudinal axis of the core barrel, and bracing the shroud in an axial direction with the tension rod.

* * * * *